Dec. 12, 1967 P. A. SMITH 3,357,524
FRICTION PAD SUPPORT MEANS FOR CALIPER-TYPE DISC BRAKES
Filed Aug. 16, 1965 2 Sheets-Sheet 2

INVENTOR.
PHILIP A. SMITH
BY John D. Haney
ATTY.

United States Patent Office 3,357,524
Patented Dec. 12, 1967

3,357,524
FRICTION PAD SUPPORT MEANS FOR CALIPER-TYPE DISC BRAKES
Philip A. Smith, Troy, Ohio, assignor to The B. F. Goodrich Company, New York, N.Y., a corporation of New York
Filed Aug. 16, 1965, Ser. No. 479,873
1 Claim. (Cl. 188—73)

This invention relates to brakes and more particularly to the so-called "spot" type brakes having a non-rotatable friction member with a friction face of much smaller area than the area of its mating annular friction surface on the rotatable member of the brake.

The present invention provides a brake assembly in which the brake friction members (viz. the parts which have friction linings which wear away in service) may be changed quickly and conveniently in a service installation without disassembling the brake housing or other parts of the assembly. In a preferred brake construction embodying this invention the friction member is supported in the non-rotatable brake housing by end plates fastened to the brake housing for quick removal. Each of these end plates projects from the housing toward the rotatable member to engage the ends of the friction member. Accordingly, the end plates act to restrain movement of the friction member in all directions except the direction in which the friction member is pressed toward the rotatable member, and the end plates also transmit the braking torque from the rotatable member to the non-rotatable housing.

To remove the friction member it is merely necessary to remove one of the end plates from the housing. Then the adjoining member is removed by sliding it from between the housing and the rotatable member in a direction away from the other end plate and parallel to the friction surface of the rotatable member. This is easily accomplished without removing or disassembling the housing itself or the brake actuation mechanism. Also, inasmuch as the braking torque is transmitted to the brake housing primarily through one or the other of the end plates (depending on the rotational direction of the rotatable member) there is no significant load imposed on the actuating mechanism while the brake is engaged. Moreover, this design makes it possible to employ a heavy well-reinforced integral brake housing which has excellent deformation resistance.

The invention will be further described with reference to a preferred disc brake assembly embodying the invention and which is shown in the accompanying drawings as one example of how this invention may be practiced. In the drawings.

The brake assembly comprises a flat smooth rigid annular disc 10 and a brake mechanism 12 fastened rigidly to an adjoining frame 13 by bolts 14. The brake mechanism 12 is the non-rotatable member in this assembly and the brake disc 10 is rotatable relative thereto on a suitable axle, not shown.

Figure 1:
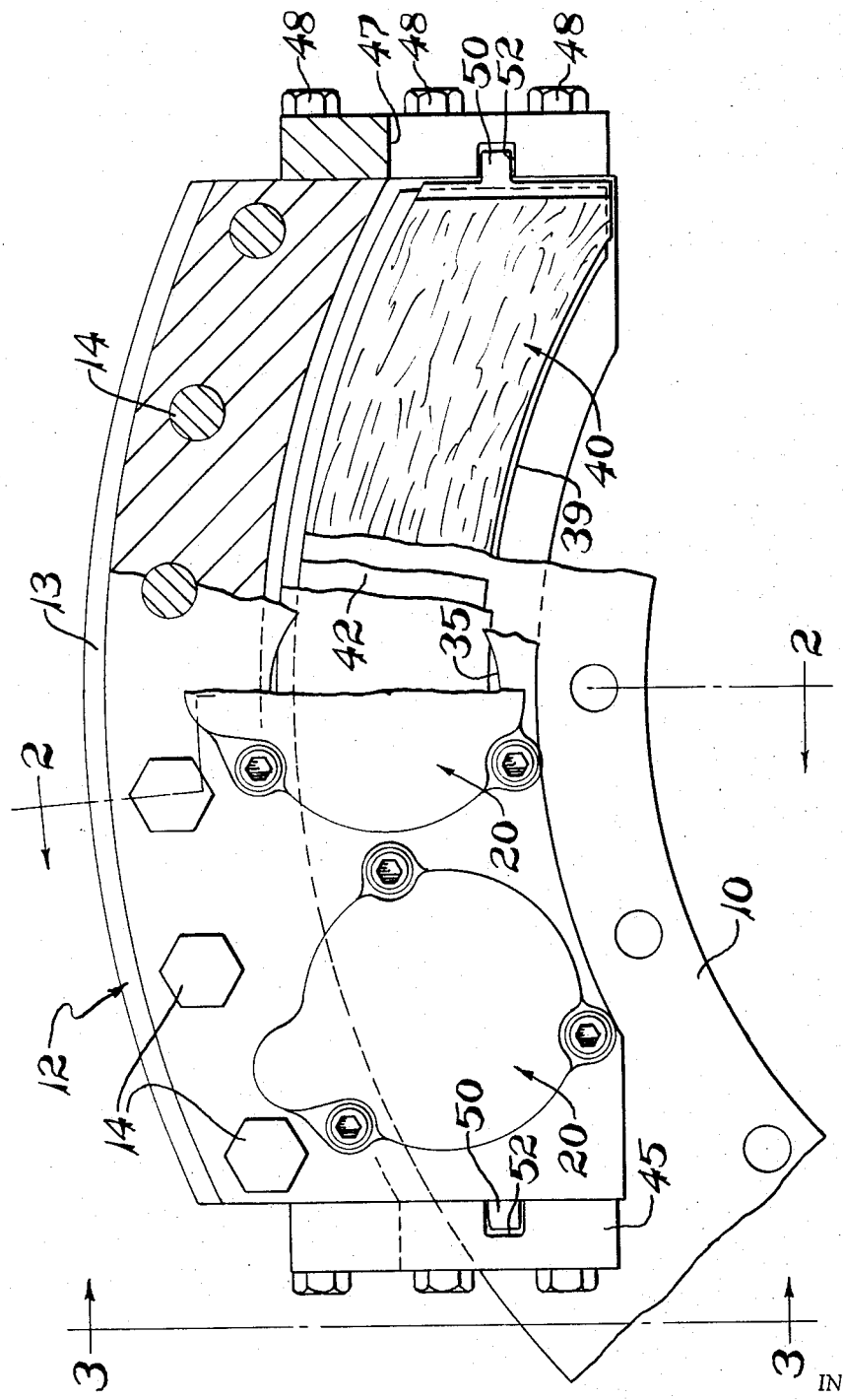
FIG. 1 is a view of a disc brake assembly looking in the axial direction of the wheel, and with certain of the parts being broken away.
Figures 2, 3:
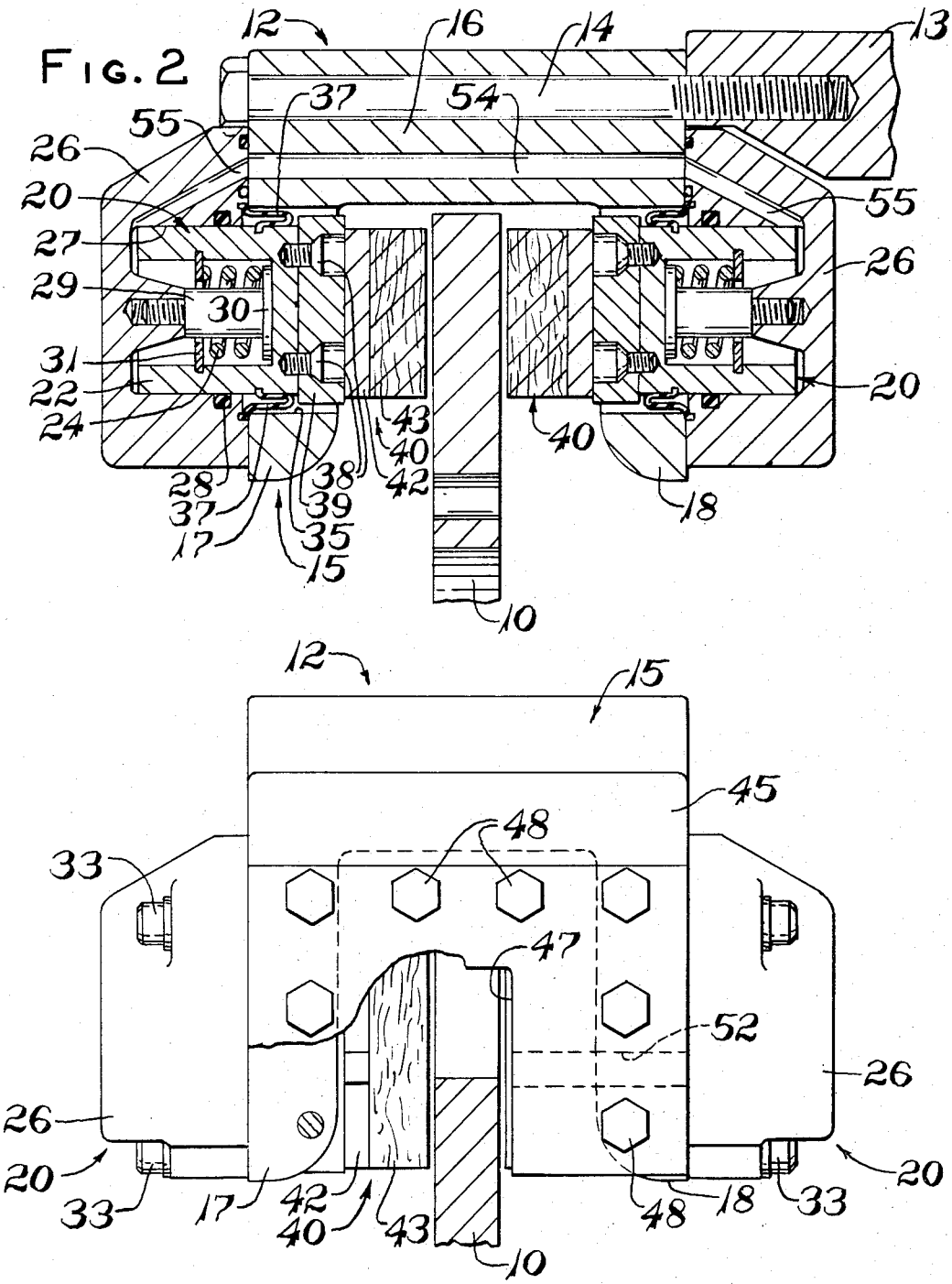
FIG. 2 is a cross sectional view taken along the line 2—2 of FIG. 1, the brake mechanism being shown in released position.
FIG. 3 is a detail view taken on the line 3—3 of FIG. 1 with some parts broken away.

Referring to FIGS. 1 and 2, the brake mechanism 12 includes a rigid housing 15 which in cross section is caliper shaped. In its lengthwise direction the housing is arcuately curved approximately concentric with the brake disc. The housing 15 includes a massive outer body piece 16 and two integral side pieces 17 and 18. The body piece 16 is disposed transversely of the brake disc and through this portion of the housing the mounting bolts 14 extend. The integral side pieces of the body flank the opposite sides of the disc 10 and cooperate to maintain the brake actuation mechanism consisting of a group of piston assemblies 20.

On each side piece 17 and 18 of the housing, three identical piston assemblies 20 are mounted. The internal details of each piston assembly are best shown in FIG. 2.

Each piston assembly 20 includes a piston head 22 connected through a retractor spring 24 to a piston housing 26. The piston head 22 is received slidably in a bore 27 inside a housing 26 and an O-ring 28 seals the piston in this bore. The piston head 22 is hollow and surrounds a stud 29 which is threaded into the piston housing 26 and at its opposite end has a flanged head 30 against which retractor spring 24 bears. The opposite end of spring 24 bears against a rigid snap ring 31 seated in the interior wall of piston 26.

Each piston housing 26 is fastened by three cap screws 33 to the outside surface of the side pieces 17 or 18 of brake housing as the case may be. In each side piece there is a hole 35 into which the piston head 22 extends and through which it reciprocates in the operation of the brake.

The retractor spring 24 is maintained under compression between flange 30 and snap ring 31 so that it normally urges the piston head 22 into the piston housing 26 and opposes movement of the piston in response to the actuating fluid as will be more fully explained. Each piston assembly 20 further includes an annular flexible rubber boot 37 between the piston and the housing 26 at the point where the piston projects into the hole 35 to protect the sliding external surface of the piston from damage by dirt, corrosion, etc. The piston heads 22 in each of the three piston assemblies in each side piece of the housing are fastened by screws 38 to a single arcuately shaped pressure plate 39 which tends to equalize the force transmitted by the pistons to the adjoining friction members 40 of the brake.

There are two friction members 40 in this brake flanking opposite sides of the rotatable brake disc 10. Each member 40 is located between the side pieces 17 or 18 and the disc.

Each friction member 40 is arcuately shaped of approximately the same curvature as the portion of the brake disc which it engages and includes a rigid metal lining carrier 42 to which a friction lining 43 is fastened. The lining 43 may be either an organic or a metallic type abrasive lining material which are well known in the art and may be fastened to the lining carrier by suitable adhesives or other forms of fasteners not shown.

The two friction members 40 are collectively supported inside the brake housing by end plates 45 shown in FIGS. 1 and 3. The end plates 45 bridge between the end edges of the housing side pieces 17 and 18 in a direction transverse to the brake disc 10 and they are generally rectangular except for a medial slot 47 (see FIG. 3) through which the brake disc 10 extends. Each end plate is detachably connected to the brake housing 15 by a series of cap screws 48 which are threaded into the end edges of outer body piece 16 and the side pieces 17 and 18 of housing 15.

The friction members 40 extend arcuately through the housing from one end plate 45 to the opposite end plate and the friction members include projecting lugs 50 on their opposite ends which fit into corresponding slots 52 formed on the inwardly directed face of each end plate. In this manner the end plates provide the sole support inside the brake housing for the friction members 40, the interlocking lugs 50 and slots 52 restraining movement of the friction members 40 in any direction except the direction in which they are pressed toward the brake disc 10. When the friction members 40 are frictionally engaged with the brake disc 10, either one end plate or the other resists the braking torque imposed on the braking member by the rotating brake disc and transmits this torque in turn to the brake housing 15 and eventually to the frame 13 on which the housing is mounted.

The brake mechanism is hydraulically actuated by a source of fluid pressure, not shown, but which can be communicated in any appropriate way to a passage 54 in the housing 15 which in turn is joined through passages 55 in the piston housings 26 to the space inside the piston housings 26 behind piston heads 22. In response to such fluid pressure the piston heads 22 are displaced against the friction members 40 and compress them tightly against the rotatable brake disc 10. On release of pressure, spring 24 retracts the piston 22 and the friction members 40 merely "rattle" away from the disc 10, the friction members 40 being free to slide toward and away from the disc 10 as a result of the slots 52 in the end plates 45.

Removing the friction members 40 for replacement is particularly simple. This is done by removing one of the end plates 45 and then withdrawing the friction members 40 from between the brake disc and the adjoining side pieces 17 and 18 of the housing by moving them in a direction parallel to the braking surface of disc 10. New friction members are inserted according to the reverse procedure.

When properly installed the friction members 40 are "suspended" or supported in the housing solely by the interlocking engagement of their end lugs 50 with the slots 52 in the end plate 45. When the friction members are engaged with the disc, the rotation of the disc tends to shift the friction members arcuately against either one or the other of the end plates 45 depending on the rotational direction of the disc. The end plates therefore transmit the braking torque generated at the friction interface of the disc to the housing 15. There is no significant lateral load thus imposed on the piston heads 22.

Variations are included within the scope of the appended claims.

What is claimed is:

A brake assembly comprising a rotatable disc; a rigid non-rotatable housing having a body portion embracing one peripheral edge of the disc and integral side pieces flanking the opposite faces of the rotatable disc; a pair of opposing friction members, each between one of said side pieces and the adjoining face of the disc; means in the housing for pressing the friction members laterally against opposing sides of the disc to retard its rotation; end plates releasably fastened to the opposing ends of the housing so that each bridges between the end edges of said side pieces of the housing and through which said disc projects, said end plates having mutually parallel inside faces conforming to and adapted to abuttingly engage the adjoining end edges of said friction members to resist displacement of said friction members in the rotational plane of the disc when the brake is engaged, and means interlocking a portion of said end edges of said friction members with said inside faces of said end plates to suspend said friction members between said end plates for slidable movement transverse to the rotational plane, said interlocking means comprising an interfitting lug and slot connection providing the sole support for said friction members in said housing.

References Cited

UNITED STATES PATENTS 2,820,530  1/1958  Chovings et al. _____ 188—73
2,921,650  1/1960  Butler _____ 188—73

FOREIGN PATENTS 1,229,040  3/1960  France.

MILTON BUCHLER, *Primary Examiner.*

G. E. HALVOSA, *Assistant Examiner.*